United States Patent
Shikhman

(10) Patent No.: US 9,123,002 B2
(45) Date of Patent: Sep. 1, 2015

(54) GRAPHICALLY BASED METHOD FOR DEVELOPING RULES FOR MANAGING A LABORATORY WORKFLOW

(75) Inventor: Menahem Shikhman, Miami, FL (US)

(73) Assignee: Abbott Informatics Corporation, Hollywood, FL (US)

( * ) Notice: Subject to any disclaimer, the term of this patent is extended or adjusted under 35 U.S.C. 154(b) by 705 days.

(21) Appl. No.: 13/118,054

(22) Filed: May 27, 2011

(65) Prior Publication Data
US 2012/0304096 A1    Nov. 29, 2012

(51) Int. Cl.
*G06F 3/0481*    (2013.01)
*G06Q 10/06*    (2012.01)

(52) U.S. Cl.
CPC ........................................ *G06Q 10/06* (2013.01)

(58) Field of Classification Search
USPC .......................................................... 715/771
See application file for complete search history.

(56) References Cited

U.S. PATENT DOCUMENTS

| | | | |
|---|---|---|---|
| 4,812,996 A | 3/1989 | Stubbs | |
| 4,831,580 A | 5/1989 | Yamada | |
| 4,985,857 A | 1/1991 | Bajpai et al. | |
| 5,104,621 A | 4/1992 | Pfost et al. | |
| 5,532,941 A | 7/1996 | Lin | |
| 5,614,415 A | 3/1997 | Markin | |
| 5,664,093 A | 9/1997 | Barnett et al. | |
| 5,697,788 A * | 12/1997 | Ohta ............................. | 434/118 |
| 5,812,394 A | 9/1998 | Lewis et al. | |
| 5,920,718 A * | 7/1999 | Uczekaj et al. ............... | 717/109 |
| 5,946,471 A | 8/1999 | Voorhees et al. | |
| 5,985,670 A | 11/1999 | Markin | |
| 6,055,487 A | 4/2000 | Margery et al. | |
| 6,064,812 A | 5/2000 | Parthasarathy et al. | |
| 6,094,684 A | 7/2000 | Pallmann | |
| 6,102,965 A | 8/2000 | Dye et al. | |
| 6,173,438 B1 | 1/2001 | Kodosky et al. | |
| 6,192,320 B1 | 2/2001 | Margrey et al. | |
| 6,219,628 B1 | 4/2001 | Kodosky et al. | |
| 6,298,474 B1 | 10/2001 | Blowers et al. | |
| 6,326,147 B1 | 12/2001 | Oldham et al. | |
| 6,370,569 B1 | 4/2002 | Austin | |
| 6,526,566 B1 | 2/2003 | Austin | |
| 6,581,012 B1 | 6/2003 | Aryev et al. | |
| 6,643,691 B2 | 11/2003 | Austin | |
| 6,681,198 B2 | 1/2004 | Buote et al. | |
| 6,751,653 B2 | 6/2004 | Austin | |
| 6,879,926 B2 | 4/2005 | Schmit et al. | |

(Continued)

OTHER PUBLICATIONS

STARLIMS Version 10 user manual manufactured by STARLIMS Corporation, released on Mar. 13, 2006.*

(Continued)

*Primary Examiner* — Reza Nabi
(74) *Attorney, Agent, or Firm* — Beth Vrioni

(57) ABSTRACT

A computer readable memory medium comprising program instructions for graphically creating a rule for defining a workflow in a laboratory management system is provided. The program instructions are executable by a processor to generate a first node within a graphical diagram in response to user input and to display a node condition/action window adjacent the graphical diagram. The first node represents an action or condition. The graphical diagram represents the rule and each node within the graphical diagram assists in creating the rule. The node condition/action window displays program code for executing the action or condition represented by the first node.

23 Claims, 11 Drawing Sheets

(56) References Cited

U.S. PATENT DOCUMENTS

| | | |
|---|---|---|
| 6,909,974 B2 | 6/2005 | Yung et al. |
| 6,938,026 B2 | 8/2005 | Yundt-Pacheco |
| 7,000,191 B2 | 2/2006 | Schmitt et al. |
| 7,162,387 B2 | 1/2007 | Johnson et al. |
| 7,197,418 B2 | 3/2007 | Fuller, III et al. |
| 7,197,743 B2 | 3/2007 | Borg et al. |
| 7,200,838 B2 | 4/2007 | Kodosky et al. |
| 7,275,070 B2 | 9/2007 | Kataria et al. |
| 7,275,235 B2 | 9/2007 | Molinari et al. |
| 7,333,962 B2 | 2/2008 | Zen |
| 7,379,821 B2 | 5/2008 | Yung et al. |
| 7,379,823 B2 | 5/2008 | Yung et al. |
| 7,491,367 B2 | 2/2009 | Yung et al. |
| 7,499,824 B2 | 3/2009 | Johnson et al. |
| 7,506,304 B2 | 3/2009 | Morrow et al. |
| 7,512,931 B2 | 3/2009 | Schmit |
| 7,536,269 B2 | 5/2009 | Sierer et al. |
| 7,565,351 B1 | 7/2009 | Callaghan |
| 7,574,690 B2 | 8/2009 | Shah et al. |
| 7,593,787 B2 | 9/2009 | Feingold et al. |
| 7,593,944 B2 | 9/2009 | Rogers et al. |
| 7,594,181 B2 * | 9/2009 | Rothwein et al. ............. 715/763 |
| 7,594,220 B2 | 9/2009 | Kodosky et al. |
| 7,594,226 B2 | 9/2009 | Stelzer et al. |
| 7,603,478 B2 | 10/2009 | Thurman et al. |
| 7,603,652 B2 | 10/2009 | Makowski et al. |
| 7,606,950 B2 | 10/2009 | Breyer |
| 7,607,070 B2 | 10/2009 | Clark et al. |
| 7,613,954 B2 | 11/2009 | Grey et al. |
| 7,620,459 B2 | 11/2009 | Renner |
| 7,620,897 B2 | 11/2009 | Shah et al. |
| 7,624,294 B2 | 11/2009 | Conway |
| 7,624,375 B2 | 11/2009 | Santori et al. |
| 7,626,474 B2 | 12/2009 | Mullen et al. |
| 7,627,695 B2 | 12/2009 | Peck et al. |
| 7,627,860 B2 | 12/2009 | Kodosky et al. |
| 7,630,560 B2 | 12/2009 | Wenzel |
| 7,630,854 B2 | 12/2009 | Sierer et al. |
| 7,631,097 B2 | 12/2009 | Moch et al. |
| 7,631,295 B2 | 12/2009 | Makowski et al. |
| 7,644,207 B2 | 1/2010 | Castro et al. |
| 7,647,562 B2 | 1/2010 | Ghercioiu et al. |
| 7,647,577 B2 * | 1/2010 | Wang et al. .................... 717/105 |
| 7,647,578 B2 | 1/2010 | Murphy et al. |
| 7,647,600 B2 | 1/2010 | Muller et al. |
| 7,649,726 B2 | 1/2010 | Castro |
| 7,650,264 B2 | 1/2010 | Kodosky et al. |
| 7,650,316 B2 | 1/2010 | Peck et al. |
| 7,650,574 B2 | 1/2010 | Nattinger |
| 7,650,589 B2 | 1/2010 | Cifra |
| 7,650,594 B2 | 1/2010 | Nattinger |
| 7,667,582 B1 * | 2/2010 | Waldorf ........................ 340/440 |
| 7,668,376 B2 | 2/2010 | Lin et al. |
| 7,668,608 B2 * | 2/2010 | Nixon et al. ...................... 700/87 |
| 7,669,185 B2 | 2/2010 | Vrancic et al. |
| 7,680,605 B2 | 3/2010 | Yung et al. |
| 7,684,878 B2 | 3/2010 | Reindel et al. |
| 7,689,727 B2 | 3/2010 | Chandhoke |
| 7,689,917 B2 | 3/2010 | Washington et al. |
| RE41,228 E | 4/2010 | Kodosky et al. |
| 7,694,273 B2 * | 4/2010 | Kodosky et al. ............. 717/113 |
| 7,701,869 B2 | 4/2010 | Hogan |
| 7,702,416 B2 | 4/2010 | Ravish et al. |
| 7,702,417 B2 | 4/2010 | Ravish et al. |
| 7,703,027 B2 | 4/2010 | Hsu et al. |
| 7,703,032 B2 | 4/2010 | Wells |
| 7,703,034 B2 | 4/2010 | Kornerup et al. |
| 7,707,014 B2 | 4/2010 | Kodosky et al. |
| 7,725,356 B2 | 5/2010 | Shah et al. |
| 7,725,627 B2 | 5/2010 | Crain, II et al. |
| 7,725,874 B2 | 5/2010 | Kornerup et al. |
| 7,725,877 B2 | 5/2010 | Andrade et al. |
| 7,730,450 B2 | 6/2010 | Mercer |
| 7,743,335 B2 | 6/2010 | Rogers et al. |
| 7,743,362 B2 | 6/2010 | Peck et al. |
| 7,757,207 B2 * | 7/2010 | Yan et al. ...................... 717/109 |
| 7,760,238 B2 | 7/2010 | Giesen |
| 7,761,802 B2 | 7/2010 | Shah et al. |
| 7,761,846 B2 | 7/2010 | Hayles |
| 7,761,847 B2 | 7/2010 | Kornerup et al. |
| 7,761,859 B2 | 7/2010 | Low |
| 7,764,619 B2 | 7/2010 | Mathena et al. |
| 7,765,278 B2 | 7/2010 | Dove et al. |
| 7,765,493 B2 | 7/2010 | Chickles et al. |
| 7,769,597 B2 | 8/2010 | Fry et al. |
| 7,778,717 B2 * | 8/2010 | Bachman et al. ............... 700/83 |
| 7,791,671 B2 | 9/2010 | Schultz et al. |
| 7,793,258 B2 * | 9/2010 | Sundararajan et al. ........ 717/109 |
| 7,793,273 B2 | 9/2010 | Mercer et al. |
| 7,801,258 B2 | 9/2010 | Narus et al. |
| 7,802,229 B2 | 9/2010 | Kornerup et al. |
| 7,870,512 B2 * | 1/2011 | Misovski ........................ 715/861 |
| 7,958,454 B2 * | 6/2011 | Gaudette ........................ 715/763 |
| 2002/0109722 A1 | 8/2002 | Rogers et al. |
| 2002/0111783 A1 | 8/2002 | Kodosky et al. |
| 2002/0174264 A1 | 11/2002 | Fuller et al. |
| 2002/0184326 A1 | 12/2002 | Thomson |
| 2002/0196282 A1 | 12/2002 | Washington et al. |
| 2003/0036866 A1 | 2/2003 | Nair et al. |
| 2003/0144997 A1 | 7/2003 | Hugley |
| 2003/0145252 A1 | 7/2003 | Grey et al. |
| 2003/0145280 A1 | 7/2003 | Grey et al. |
| 2003/0165259 A1 | 9/2003 | Balent et al. |
| 2003/0167455 A1 * | 9/2003 | Iborra et al. .................... 717/105 |
| 2003/0172127 A1 | 9/2003 | Northrup et al. |
| 2003/0177042 A1 | 9/2003 | Leon |
| 2003/0177471 A1 | 9/2003 | Chiu et al. |
| 2004/0017392 A1 * | 1/2004 | Welch ............................ 345/738 |
| 2004/0031019 A1 * | 2/2004 | Lamanna et al. .............. 717/125 |
| 2004/0032412 A1 | 2/2004 | Odom |
| 2004/0032430 A1 | 2/2004 | Yung et al. |
| 2004/0034478 A1 | 2/2004 | Yung et al. |
| 2004/0039531 A1 | 2/2004 | Yung et al. |
| 2004/0042471 A1 | 3/2004 | Yung et al. |
| 2004/0090439 A1 * | 5/2004 | Dillner ........................... 345/440 |
| 2004/0093180 A1 | 5/2004 | Grey et al. |
| 2004/0122708 A1 | 6/2004 | Avinash et al. |
| 2004/0150667 A1 | 8/2004 | Dove et al. |
| 2004/0205111 A1 | 10/2004 | Chasmawala et al. |
| 2004/0230945 A1 | 11/2004 | Bryant et al. |
| 2005/0022103 A1 | 1/2005 | Yundt-Pacheco |
| 2005/0028107 A1 | 2/2005 | Gomes et al. |
| 2005/0028138 A1 | 2/2005 | Case et al. |
| 2005/0038676 A1 | 2/2005 | Showalter et al. |
| 2005/0049814 A1 | 3/2005 | Ramchandani |
| 2005/0070019 A1 | 3/2005 | Yamamoto |
| 2005/0076002 A1 | 4/2005 | Williams et al. |
| 2005/0091618 A1 * | 4/2005 | Ramamoorthy et al. ...... 715/763 |
| 2005/0106736 A1 | 5/2005 | Yung et al. |
| 2005/0149566 A1 | 7/2005 | Baek et al. |
| 2005/0155014 A1 | 7/2005 | Andrade et al. |
| 2005/0155015 A1 | 7/2005 | Novacek |
| 2005/0177816 A1 | 8/2005 | Kudukoli et al. |
| 2005/0195194 A1 | 9/2005 | Cummings |
| 2005/0228608 A1 | 10/2005 | Wells |
| 2005/0257195 A1 | 11/2005 | Morrow et al. |
| 2005/0268173 A1 | 12/2005 | Kudukoli et al. |
| 2005/0273272 A1 * | 12/2005 | Brando et al. ................... 702/19 |
| 2006/0008151 A1 | 1/2006 | Lin et al. |
| 2006/0015847 A1 * | 1/2006 | Carroll ........................... 717/109 |
| 2006/0036656 A1 | 2/2006 | Mercer |
| 2006/0036799 A1 | 2/2006 | Shah et al. |
| 2006/0036997 A1 | 2/2006 | Low |
| 2006/0041860 A1 | 2/2006 | Carmichael et al. |
| 2006/0088940 A1 | 4/2006 | Feingold et al. |
| 2006/0117302 A1 | 6/2006 | Mercer et al. |
| 2006/0156294 A1 | 7/2006 | Fuller, III et al. |
| 2006/0168183 A1 | 7/2006 | Fuller, III et al. |
| 2006/0168515 A1 | 7/2006 | Dorsett, Jr. et al. |
| 2006/0190105 A1 | 8/2006 | Hsu et al. |
| 2006/0225034 A1 | 10/2006 | Peck et al. |
| 2006/0235548 A1 * | 10/2006 | Gaudette ......................... 700/83 |
| 2006/0291399 A1 | 12/2006 | Mathena et al. |
| 2007/0010911 A1 | 1/2007 | Feingold et al. |

(56) References Cited

U.S. PATENT DOCUMENTS

| | | |
|---|---|---|
| 2007/0038592 A1 | 2/2007 | Haub et al. |
| 2007/0044030 A1 | 2/2007 | Hayles |
| 2007/0044072 A1 | 2/2007 | Hayles |
| 2007/0044073 A1 | 2/2007 | Kornerup et al. |
| 2007/0044078 A1 | 2/2007 | Cifra |
| 2007/0088865 A1 | 4/2007 | Breyer |
| 2007/0089063 A1 | 4/2007 | Breyer |
| 2007/0112804 A1 | 5/2007 | DeSimas et al. |
| 2007/0129818 A1 | 6/2007 | Andrade et al. |
| 2007/0129894 A1 | 6/2007 | Yung et al. |
| 2007/0141711 A1 | 6/2007 | Stephens et al. |
| 2007/0150805 A1* | 6/2007 | Misovski ............... 715/518 |
| 2007/0168943 A1 | 7/2007 | Marini et al. |
| 2007/0179644 A1 | 8/2007 | Ravish et al. |
| 2007/0185828 A1 | 8/2007 | Brown |
| 2007/0198445 A1 | 8/2007 | Zen |
| 2007/0198923 A1* | 8/2007 | Kodosky et al. ............ 715/523 |
| 2007/0214427 A1 | 9/2007 | Peck et al. |
| 2007/0233655 A1 | 10/2007 | Engels |
| 2007/0234195 A1 | 10/2007 | Wells |
| 2007/0244990 A1 | 10/2007 | Wells |
| 2007/0297443 A1 | 12/2007 | Bowers et al. |
| 2008/0022264 A1 | 1/2008 | Macklem et al. |
| 2008/0022270 A1 | 1/2008 | Morrow et al. |
| 2008/0034298 A1 | 2/2008 | Kodosky et al. |
| 2008/0034300 A1 | 2/2008 | Shah et al. |
| 2008/0034345 A1 | 2/2008 | Curtis et al. |
| 2008/0043826 A1 | 2/2008 | Castro et al. |
| 2008/0046414 A1 | 2/2008 | Haub et al. |
| 2008/0052665 A1 | 2/2008 | Bray |
| 2008/0059944 A1 | 3/2008 | Patterson et al. |
| 2008/0240321 A1 | 10/2008 | Narus et al. |
| 2008/0256511 A1 | 10/2008 | Lay et al. |
| 2008/0263343 A1 | 10/2008 | Kassas et al. |
| 2008/0263515 A1 | 10/2008 | Dellas et al. |
| 2008/0263521 A1 | 10/2008 | Neumann et al. |
| 2008/0270920 A1 | 10/2008 | Hudson |
| 2008/0300697 A1 | 12/2008 | Moriat et al. |
| 2008/0307332 A1 | 12/2008 | Hayles et al. |
| 2009/0019453 A1 | 1/2009 | Kodaganur et al. |
| 2009/0027509 A1 | 1/2009 | Giesen |
| 2009/0049424 A1 | 2/2009 | Kumar et al. |
| 2009/0089715 A1 | 4/2009 | Dickey |
| 2009/0106755 A1 | 4/2009 | Chandhoke |
| 2009/0106761 A1 | 4/2009 | Chandhoke |
| 2009/0113322 A1 | 4/2009 | Rogers |
| 2009/0113337 A1 | 4/2009 | Rogers |
| 2009/0121908 A1 | 5/2009 | Regier |
| 2009/0130765 A1 | 5/2009 | Bauer et al. |
| 2009/0178025 A1 | 7/2009 | Morrow et al. |
| 2009/0193396 A1 | 7/2009 | Hartadinata |
| 2009/0204660 A1* | 8/2009 | Chappell ............... 709/201 |
| 2009/0234471 A1 | 9/2009 | Chandhoke |
| 2009/0235231 A1 | 9/2009 | Kodosky et al. |
| 2009/0241068 A1 | 9/2009 | Page et al. |
| 2009/0241069 A1 | 9/2009 | Fuller III et al. |
| 2009/0288025 A1 | 11/2009 | King et al. |
| 2009/0288073 A1 | 11/2009 | Gosalia et al. |
| 2009/0292511 A1 | 11/2009 | Vrancic et al. |
| 2009/0293044 A1 | 11/2009 | Boettcher et al. |
| 2009/0297042 A1 | 12/2009 | Nair et al. |
| 2009/0299924 A1 | 12/2009 | Bauer et al. |
| 2009/0319987 A1 | 12/2009 | Bartz |
| 2010/0010646 A1 | 1/2010 | Drew et al. |
| 2010/0023866 A1 | 1/2010 | Peck et al. |
| 2010/0030509 A1 | 2/2010 | Crain, II et al. |
| 2010/0030539 A1 | 2/2010 | Chandhoke et al. |
| 2010/0031231 A1 | 2/2010 | Ilic et al. |
| 2010/0058289 A1 | 3/2010 | Hudson, III et al. |
| 2010/0088618 A1* | 4/2010 | Mayer-Ullmann ........... 715/763 |
| 2010/0293461 A1* | 11/2010 | Boezeman et al. ........... 715/708 |
| 2011/0071039 A1* | 3/2011 | Kumar et al. ................. 506/9 |
| 2011/0078103 A1* | 3/2011 | Teng et al. ................. 706/47 |
| 2012/0174060 A1* | 7/2012 | Rivkin ................. 717/105 |
| 2012/0216219 A1* | 8/2012 | Sharma et al. ............... 719/331 |
| 2012/0299928 A1* | 11/2012 | Shikhman ............... 345/440 |
| 2012/0303472 A1* | 11/2012 | Koehler et al. ............. 705/26.1 |

OTHER PUBLICATIONS

United States Patent and Trademark Office (International Searching Authority), International Search Report and Written Opinion for PCT/US 12/36282 (Filing Date May 3, 2012) Date of Mailing: Jul. 13, 2012.

Search Report for European Application No. 12 79 3253 dated Feb. 3, 2015, 6 pages.

* cited by examiner

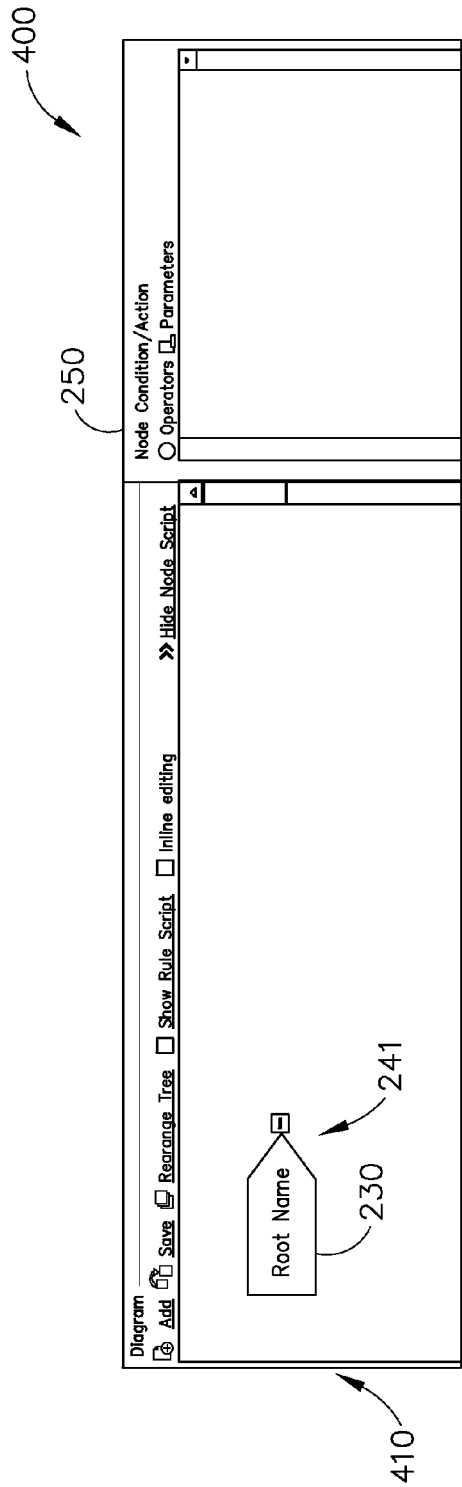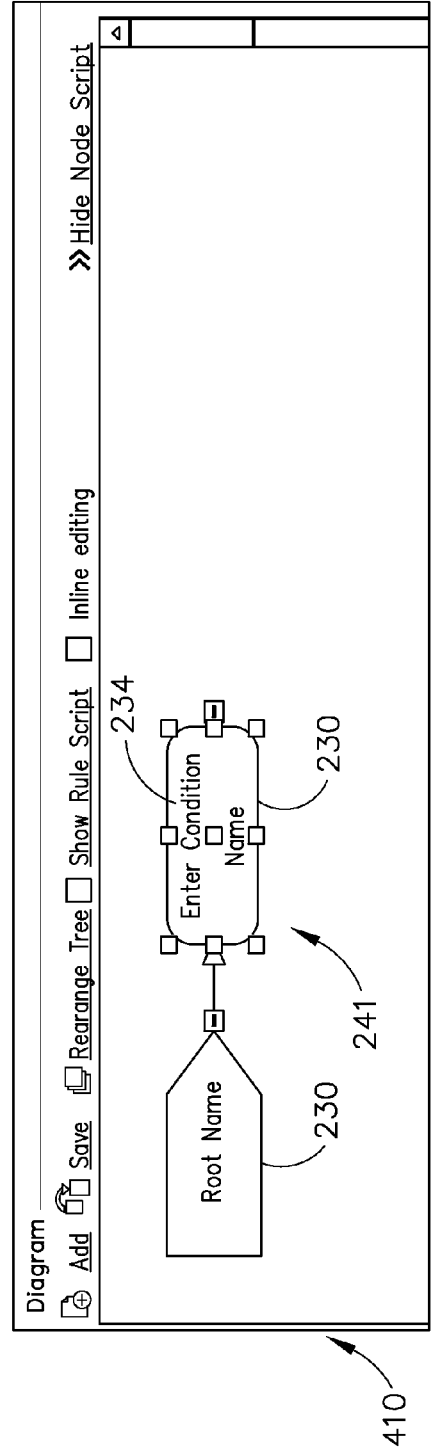
Fig. 4
Fig. 5

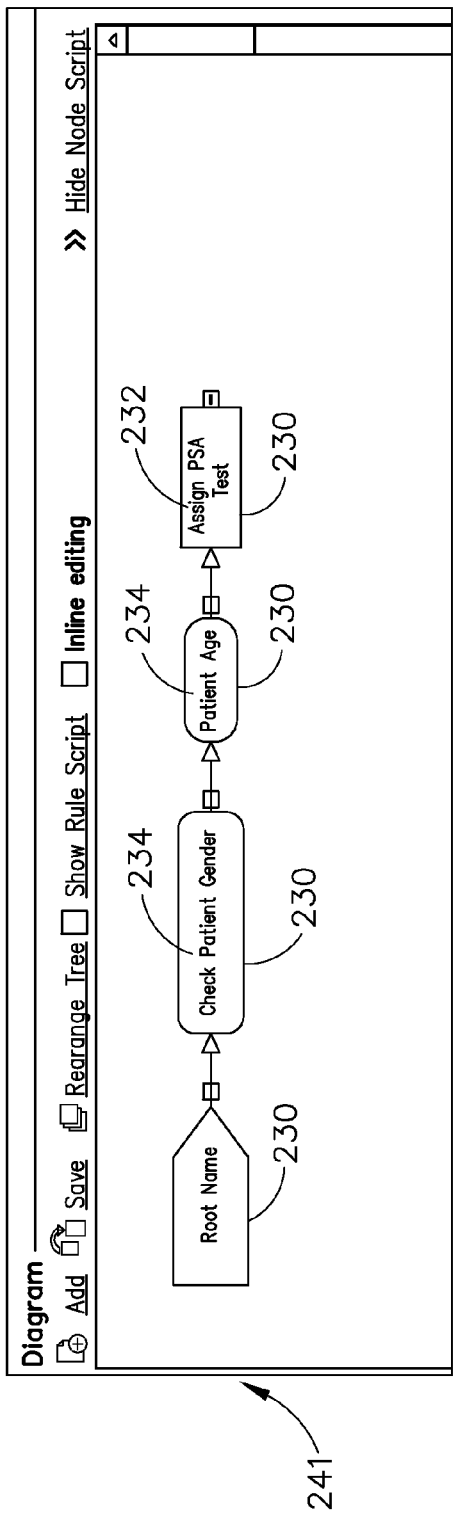
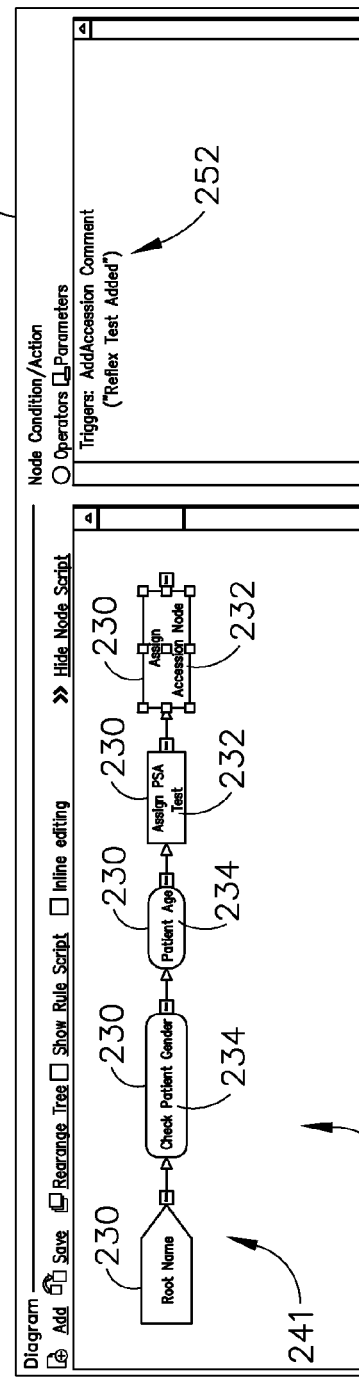
Fig. 8
Fig. 9

```
/*Node Name: Check Patient Gender, Type: CONDITION;
:TRY;
    :IF  Patient:Sex == 'Male';
        /*Node Name: Patient Age, Type: CONDITION;
        :TRY;
            :IF
            Patient:Age > 50
            .AND.
            Patient:AgeUnits == 'Years';
                /*Node Name: Assign PSA Test, Type: ACTION
                :TRY;
                    Triggers:AddTestTo Sample("Training PSA
                    /*Node Name: Assign Accession Note, T
                    :TRY;
                        Triggers:AddAccessionComment("Refi
                    :CATCH;
                        :DECLARE err;
```

GRAPHICALLY BASED METHOD FOR DEVELOPING RULES FOR MANAGING A LABORATORY WORKFLOW

FIELD OF THE INVENTION

The present invention relates generally a method for developing rules for managing a laboratory's workflow. In particular, the invention relates to a graphically based method for developing rules for managing a laboratory's workflow.

BACKGROUND

Laboratories use a variety of laboratory management systems to integrate laboratory software and instruments; to manage samples, laboratory users, and standards; to control other laboratory functions such as Quality Assurance (QA) and Quality Control (QC); to conduct sample planning, invoicing, and plate management; and to manage workflow. Laboratory management systems can include a variety of different types of systems for managing samples, information and/or instruments within a laboratory, such as a Laboratory Information System (LIS), a Process Development Execution System (PDES), and a Laboratory Information Management System or Laboratory Integration Management Solution (LIMS).

A Laboratory Information System ("LIS") is a class of software that receives, processes, and stores information generated by medical laboratory processes. LIS systems often must interface with instruments and other information systems such as hospital information systems (HIS).

A Process Development Execution System (PDES) is a system which is used by companies to perform development activities for manufacturing processes.

A Laboratory Information Management System or Laboratory Integration Management Solution (LIMS) is a software system used in laboratories for the integration of laboratory software and instruments and the management of samples, laboratory users, standards and other laboratory functions such as Quality Assurance (QA) and Quality Control (QC), sample planning, invoicing, plate management, and workflow automation. LIMS systems may also support information gathering, decision making, calculation, review and release into the workplace and away from the office. More recently, LIMS systems are starting to expand into Electronic Laboratory Notebooks, assay data management, data mining and data analysis.

Modern laboratory management systems have implemented extensive configurability as each laboratories needs for tracking additional data points can vary widely. Vendors of laboratory management systems often cannot make assumptions about what these data tracking needs are and therefore need to be adaptable to each environment. Users of laboratory management systems may also have regulatory concerns to comply with such as CLIA, HIPAA, GLP and FDA specifications and this can affect certain aspects of sample management in a laboratory management system. One key to compliance with many of these standards is audit logging of all changes to data of laboratory management systems, and in some cases a full electronic signature system is required for rigorous tracking of field level changes to data of laboratory management systems.

A user may configure a laboratory management system whereby users are assigned roles or groups. Typically the role of a user will dictate their access to specific data records in the laboratory management systems. Each user account is protected by security mechanisms such as a user id and a password. Users may have customized interfaces based on their role in the organization. For example, a laboratory manager might have full access to all of a laboratory management system's functions and data, whereas technicians might have access only to data and functionality needed for their individual work-tasks.

Some laboratory management systems offer some capability for integration with instruments. A laboratory management system may create control files that are "fed" into the instrument and direct its operation on some physical item such as a sample tube or sample plate. The laboratory management system may then import instrument results files to extract QC or results data for assessment of the operation on the sample or samples. Data owners may access the resulting stored information at any time.

Laboratory management systems may be customized for use in a wide variety of settings and laboratories, such as medical or clinical laboratories, biological laboratories, chemistry laboratories, chemical or petroleum laboratories, commercial or manufacturing use, forensics or crime laboratories, pathology laboratories, public safety and public health laboratories, and water processing and testing facilities.

Laboratory management system may manage various workflows within a laboratory, such as the management of samples within a laboratory, the management of information within a laboratory, and the management of instruments within a laboratory. Samples include: biological samples taken from a patient, such as blood, urine or tissue; evidence samples taken from a crime scene, such as bullets, biological samples, pictures, and video; and samples of materials, liquids, or compounds. Instruments includes analyses equipment within a laboratory and any other laboratory equipment, measurement instruments, observation instruments such as a microscope or a video camera, sensors and other such equipment within a laboratory.

One core function of laboratory management systems is the management of samples. This typically is initiated when a sample is received in the laboratory at which point the sample will be registered in the laboratory management system. This registration process may involve accessioning the sample and producing barcodes to affix to the sample container. Various other parameters may be recorded as well, such as clinical or phenotypic information corresponding with the sample. The laboratory management system may then track chain of custody of the sample as well as the sample location. Location tracking often involves assigning the sample to a particular location such as a shelf/rack/box/row/column. Other event tracking may be required such as freeze and thaw cycles that a sample undergoes in the laboratory.

In order manage a workflow in a laboratory management system, a user typically has to write program code for a computer program through which the rule operates for each rule for which the user wishes to create. The task of writing program code for a rule is often laborious and requires many hours of work from a trained computer programmer to complete. Writing program code for a rule also requires an in-depth understanding of how the laboratory management system functions. Typically, the user of a laboratory management system does not have the type of training and skills needed to write the program code needed from which the rule operates. Thus the task of writing program code for a rule usually falls to a software engineer.

It would be desirable to provide a simplified method for developing rules for managing a workflow in a laboratory management system which do not require the use of a software engineer. It would also be desirable to provide a simplified method for developing rules for managing a workflow in a laboratory management system from which an end-user could develop program code for.

SUMMARY

In one aspect, a computer readable memory medium comprising program instructions for graphically creating a rule for defining a workflow in a laboratory management system is provided. The program instructions are executable by a processor to generate a first node within a graphical diagram in response to user input and to display a node condition/action window adjacent the graphical diagram. The first node represents an action or condition. The graphical diagram represents the rule and each node within the graphical diagram assists in creating the rule. The node condition/action window displays program code for executing the action or condition represented by the first node.

In one aspect, a method for graphically creating a rule for defining a workflow in a laboratory management system is provided. The method includes generating a first node within a graphical diagram in response to user input and inputting an action or condition into a computer readable memory medium associated with the first node. The graphical diagram represents the rule and each node within the graphical diagram assists in creating the rule. The method also includes converting the graphical diagram into a computer program through which the rule operates.

In one aspect, a laboratory management system is provided. The system includes a computer readable memory medium and at least one processor operable to access from the computer readable memory medium program instructions. The program instructions are executable by the processor to generate a first node within a graphical diagram in response to user input, receive an action or condition into the computer readable memory medium associated with the first node, and convert the graphical diagram into a computer program through which the rule operates. The graphical diagram represents the rule and each node within the graphical diagram assists in creating the rule.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

FIGS. 4-9 depict various states of a rule development module displaying a graphical diagram used to generate a rule, in accordance with one embodiment of the present invention.

FIGS. 10 and 11 depict various states of a simulation module used to simulate a rule, in accordance with one embodiment of the present invention.

FIG. 12 depicts program code generated by the rule development module, in accordance with one embodiment of the present invention.

DETAILED DESCRIPTION

The present invention makes use of the discovery that by providing a user with software which can generate a graphical diagram which represents a rule for defining a workflow in a laboratory management system, program code for the rule can be generated automatically by the software without requiring the use of a software engineer, providing a means for users to more simply and easily generate rules for defining workflows in a laboratory.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1:
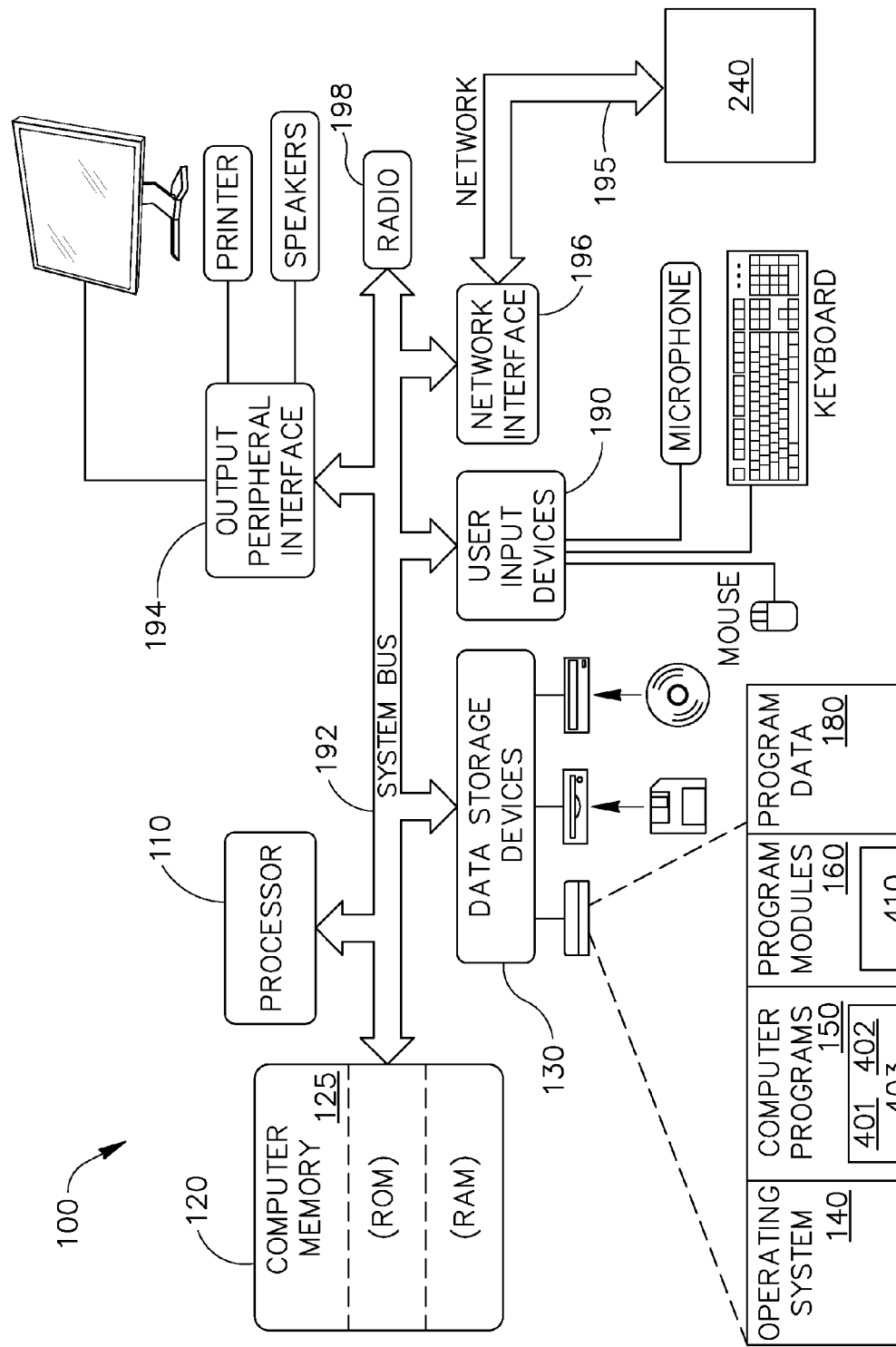
FIG. 1 depicts a block schematic diagram of an exemplary computing system, in accordance with one embodiment of the present invention.
Figure 2:
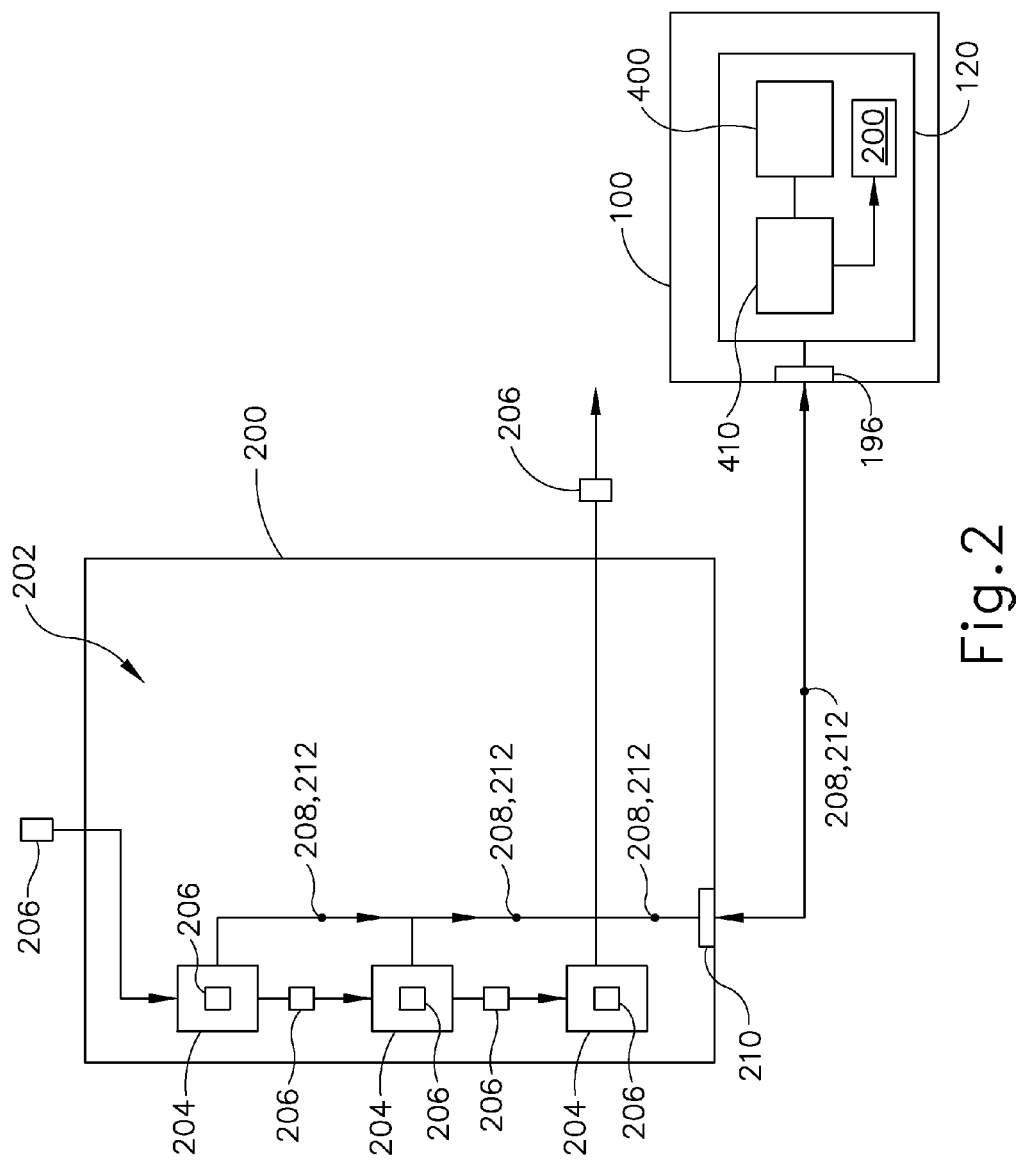
FIG. 2 depicts an illustration of a laboratory with instruments connected with a computer running a laboratory management system, in accordance with one embodiment of the present invention.

With reference to FIG. 1, depicted is an exemplary computing system for implementing embodiments. FIG. 1 includes computer 100 running a computer program 150, such as a laboratory management system (LMS) software application 400. The LMS software application 400 includes software applications such as a Laboratory Information Management System (LIMS) software application 401, a Laboratory Information System (LIS) software application 402, or a Process Development Execution System (PDES) software application 403.

The LIMS software application 401 is a software application used in laboratories for the integration of laboratory software and instruments and the management of samples, laboratory users, standards and other laboratory functions such as Quality Assurance (QA) and Quality Control (QC), sample planning, invoicing, plate management, and workflow automation. The LIS software application 402 is a software application that receives, processes, and stores information generated by medical laboratory processes. The LIS software application 402 often must interface with instruments and other information systems such as hospital information systems (HIS). The LIS software application 402 is a highly configurable application which is customized to facilitate a wide variety of laboratory workflow models. The PDES software application 403 is a software application which is used by companies to perform development activities for manufacturing processes.

The computer 100 includes a processor 110 in communication with a computer readable memory medium 120. Computer readable memory medium 120 is any medium which can be used to store information which can later be accessed by processor 110. Computer readable memory medium 120 includes computer memory 125 and data storage devices 130. Computer memory 120 is preferably a fast-access memory and is used to run program instructions executable by the processor 110. Computer memory 120 includes random access memory (RAM), flash memory, and read only memory (ROM). Data storage devices 130 are preferably physical devices and are used to store any information or computer program which may be accessed by the processor 110, such as an operating system 140, computer programs 150 such as LMS software application 400, program modules 160 such as a rule development module 410 which runs as a part of LMS software application 400, and program data 180. Data storage devices 130 and their associated computer readable memory medium provide storage of computer readable instructions, data structures, program modules and other data for the computer 100. Data storage devices 130 include magnetic medium like a floppy disk, a hard disk drive, and magnetic tape; an optical medium like a Compact Disc (CD), a Digital Video Disk (DVD), and a Blu-ray Disc; and solid state memory such as random access memory (RAM), flash memory, and read only memory (ROM).

Computer 100 further includes input devices 190 through which data may enter the computer 100, either automatically or by a user who enters commands and data. Input devices 190 can include an electronic digitizer, a flatbed scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, an instrument, a sensor, and the like. In one or more embodiments, input devices 190 are portable devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, printers, and/or display devices, which may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment 195 using logical connections to one or more remote computers, such as a remote server 240. The remote server 240 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN or WLAN through a network interface 196 or an adapter. When used in a WAN networking environment, computer 100 may include a modem or other means for establishing communications over the WAN, such as radio 198, to environments such as the Internet or to another remote computer. It will be appreciated that other means of establishing a communications link between computer 100 and other remote computers may be used.

In one embodiment, computer 100 is in communication with remote server 240, and the LMS software application 400 is run on the remote server 240, receiving commands and information from the computer 100 being input by a user. Information from the LMS software application 400 running on the remote server 240 is displayed on a display connected with the computer 100.

With reference to FIG. 9 a rule development module 410 is provided for graphically creating a rule 220 for defining a workflow 202 in a laboratory management system (LMS) software application 400 used to manage a laboratory 200. Laboratory 200 is any place of manufacture or place of analyses where actions or tests are performed on samples 206 using equipment or instruments 204. Laboratory 200 includes various types of laboratories such as medical or clinical laboratories, biological laboratories, chemistry laboratories, chemical or petroleum laboratories, commercial or manufacturing plants, forensics or crime laboratories, pathology laboratories, public safety and public health laboratories, and water processing and testing facilities. Samples 206 are any object which enters a laboratory 200 upon which an action or test is performed. Samples 206 include: biological samples taken from a patient, such as blood, urine or tissue; evidence samples taken from a crime scene, such as bullets, biological samples, pictures, and video; samples of materials, liquids, or compounds; and parts or components. Instruments 204 are any type of equipment which can perform an action or an analyses or test on a sample 206, and include laboratory instruments, manufacturing equipment such as welding tools and robotic arms, sensors such as temperature sensors and weight sensors, and imaging equipment such as bar code scanners or cameras.

Workflows 202 within a laboratory 200 consist of a sequence of connected steps which define what to do with and how to manage samples 206, information 208, and instruments 204 within a laboratory 200. Workflows 202 includes sequence of connected steps which define how to manage samples 206 within laboratory 200, manage information 208 within laboratory 200, and manage instruments 204 within a laboratory 200.

Workflows 202 for managing samples 206 are typically initiated when a sample 206 is received in the laboratory 200 at which point the sample 206 will be registered in the LMS software application 400. This registration process may involve accessioning the sample 206 and producing barcodes to affix to the sample 206 or a container containing the sample 206. Various other parameters may be recorded as well, such as clinical or phenotypic information corresponding with the sample 206. The laboratory management system may then track chain of custody of the sample 206 as well as a location of the sample 206 with the laboratory 200. Location tracking often involves assigning the sample 206 to a particular location such as a shelf/rack/box/row/column or a particular instrument 204 within the laboratory 200. Other event tracking may be required such as freeze and thaw cycles that a sample 206 may undergo in the laboratory 200. Workflows 202 for managing samples 206 may also include what tests or actions to perform on a given sample 206 and which particular instrument 204 within the laboratory 200 should be used to perform the test or action on the sample 206, along with instructions to provide the sample 206 to the particular instrument 204.

As samples 206 are routed to a particular instrument 204 within the laboratory 200, tests or actions are performed on the sample 206, and information 208 associated with the sample 206 may be generated by the instrument 204 and transmitted to the LMS software application 400. Information 208 associated with the sample 206 may also be generated before or as a sample 206 enters the laboratory 200, such as by manual data entry by a user. Information 208 associated with the sample 206 may include such things as: patent information for a patient associated with the sample 206 including the patient's address, age, birth date, height, name, identification information, language, phone number, race, sex, social security number, weight, and any other information associated with a patient; information as to the type of sample 206 including biological materials such as urine and blood, part number or part type, the composition of the sample 206, evidence, water, chemical composition, and material; information as to any instruments 204 which need to perform a test or action on the sample 206; part information associated with the sample 206; information as to where to the sample 206 originated; information 208 generated by an instrument 204 in the laboratory 200 associated with or from performing a test or action on the sample 206, such as results information or sample properties information; and any other information 208 which may be associated with the sample 206. Information 208 associated with the sample 206 is eventually entered into a database managed by the LMS software application 400.

Information 212 associated with the instruments 204 may also be generated by the instrument 204 and transmitted to the LMS software application 400. Information 212 may include: the status of an instrument 204 including any error messages received from an instrument 204 and any information as to the current state of an instrument 204; the type and model number of the instrument 204; the workload of an instrument 204; and the current operation of an instrument 204.

Workflows 202 may be influenced by information 208 and information 212, and as a result, information 208, 212 is routed to the LMS software application 400 and the rule development module 410 for use in developing rules 200. Additionally, some workflows 202 may be developed which can be used to manage to information 208, 212 and the flow of information 208, 212 between the instruments 204 and the LMS software application 400.

LMS software application 400 may be used to manage various workflows 202 within a laboratory 200 by graphically creating rules 220 using the rule development module 410. Rules 220 comprises sequences of connected nodes 230 which define what to do with and how to manage samples 206, information 208, or instruments 204 within the laboratory 200. In one embodiment, laboratory 200 is a clinical laboratory wherein three types of rules may be created or defined: 1) accessing rules, which are checked by the LMS software application 400 and, if certain conditions are met, applied at the time of sample 206 is accessioned; 2) result evaluation rules, which are checked by the LMS software application 400 and, if certain conditions are met, applied at the time information 208 associated with the sample 206 is eventually entered into a database managed by the LMS software application 400; and 3) instrument exception rules, which are checked by the LMS software application 400 and, if certain conditions are met, applied at the time certain information 212 associated with the instrument 204 is received by the LMS software application 400.

Figure 3:
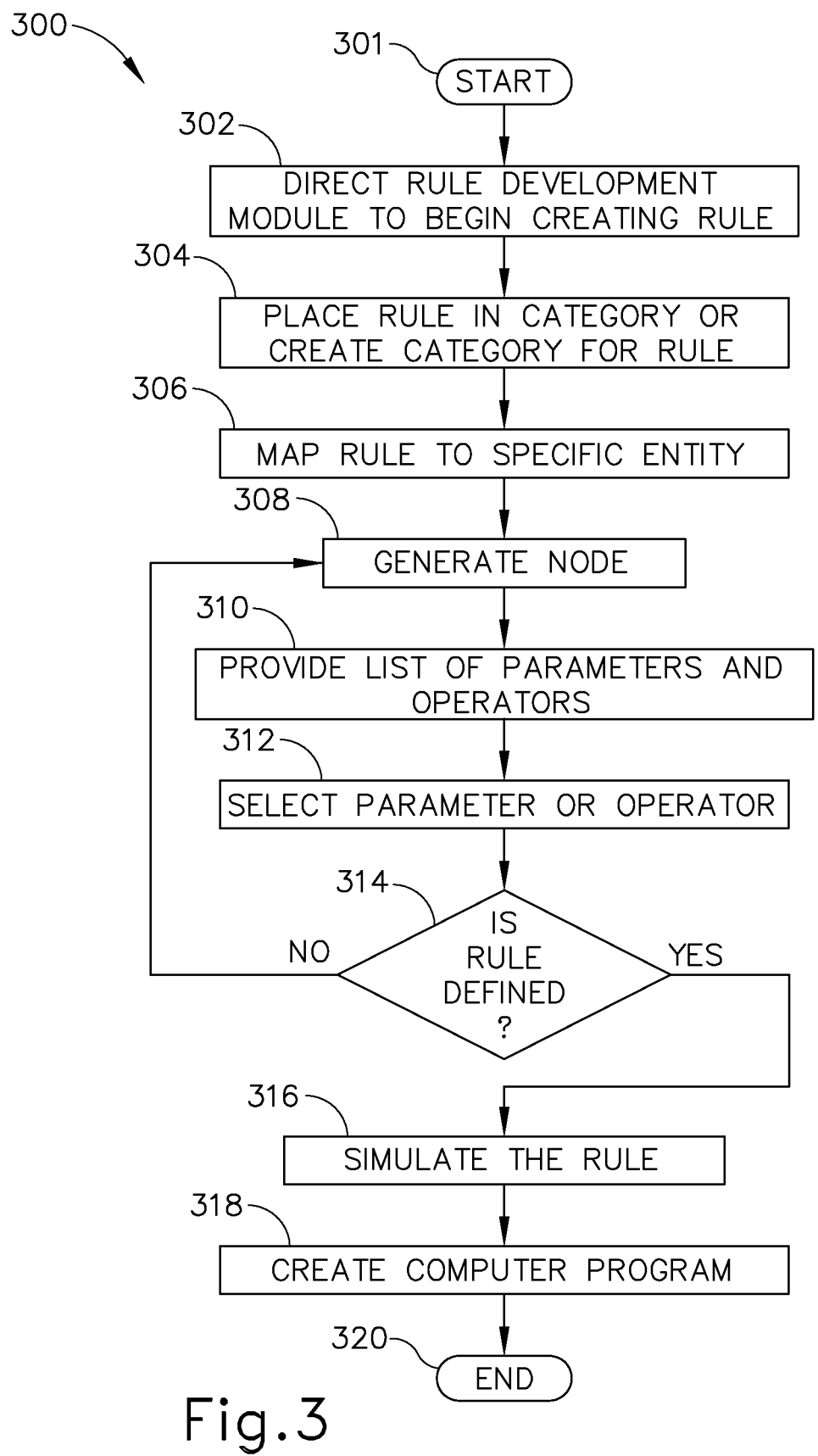
FIG. 3 depicts flowchart illustrations of methods, apparatus (systems) and computer program products, in accordance with one embodiment of the present invention.
Figure 6:
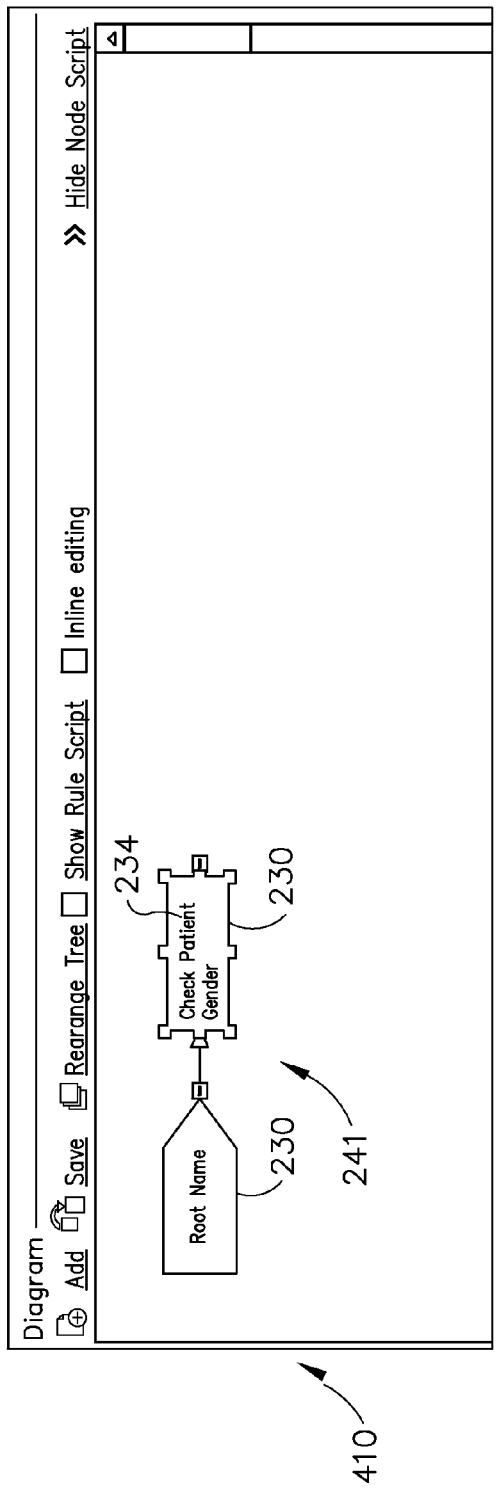

Rules 220 are created graphically using the rule development module 410, as shown in FIGS. 4-9. With reference to FIG. 3, is a flowchart representation of a method 300 for graphically creating rules 220 for defining a workflow 202 in a LMS software application 400. Method 300 is initiated at block 301 by launching LMS software application 400 within the computer 100 or the remote server 240. Concurrent with the launching the LMS software application 400, rule development module 410 is also launched which resides within or is connected with the LMS software application 400. At block 302, upon launching the LMS software application 400 and within the rule development module 410, a user may direct the rule development module 410 to begin graphically creating a rule 220. Moving to block 304, the user may then direct the rule development module 410 to place the rule 220 within a specific category or to create a category for placing the rule 220 within, as block 306. Categories serve to organize the rules 220 which are created.

Figure 14:
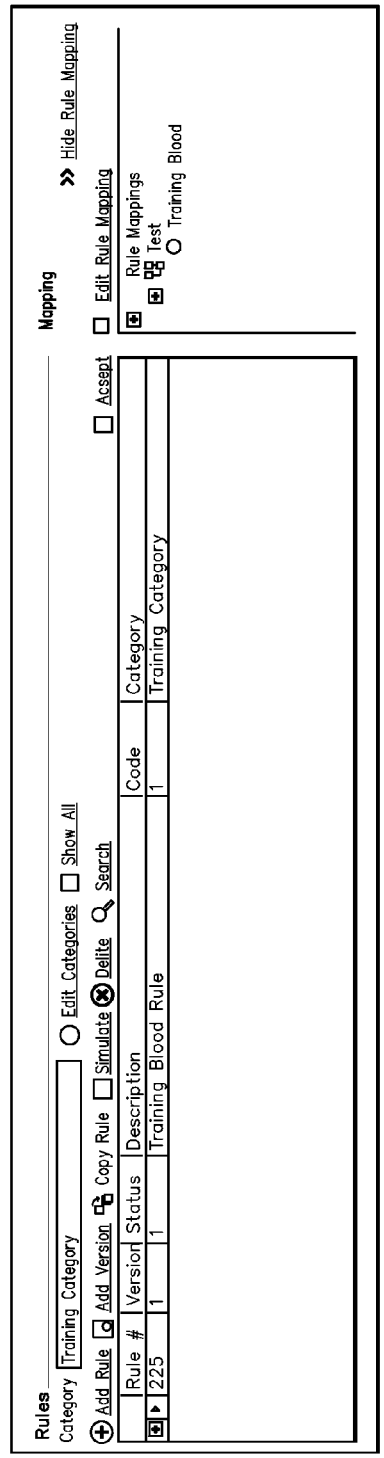

Moving to block 306, upon categorizing the rule 220, the user may then direct the rule development module 410 map a rule 220 to a specific entity for which the rule 220 will be applicable to, called rule mapping. Rule 220 may be mapped to any entity within or connected with a laboratory 200 or LMS software application 400, such as a specific test, a specific user or submitter within a laboratory 200, a specific ordering LIS or software, a specific instrument, or a specific instrument type. Rule 220 may also be mapped to a combination of entities. For example, a rule 220 could be created that automatically adds a second test (i.e. a PSA Test) to a sample 206 if a first test (i.e. a Blood Test) had been order for that sample 206 and if the sample 206 is associated with certain information 208, such as patient information which states that the sample is associated with a male patient over the age of 50. The rule mapping may be displayed by the rule development module 410 on a display, as shown in FIG. 14.

With reference to FIGS. 3 and 4, upon mapping the rule 220, the rule development module 410 begins to graphically define and create the rule 220 by generating a first node 230 within a graphical diagram 241 in response to user input, at block 308. The graphical diagram 241 represents the rule 220, and each node 230 within the graphical diagram 241 assists in creating the rule 220 and represents a specific portion of the rule 220. The first node 230 represents an action or condition which if it occurs causes the rule 220 to begin executing. Each action represents an action that may be taken and each condition represents a condition that must occur and will be checked by the LMS software application 400 to confirm that it occurs or not, for the rule 220 to proceed. In addition to an action or condition, a node 230 may represents a stop rule which is a command used to stop execution of the rule 220, or a stop category which provides the ability to exit rule execution or entire rule category execution and start the following rule/category evaluation and execution.

Figure 15:
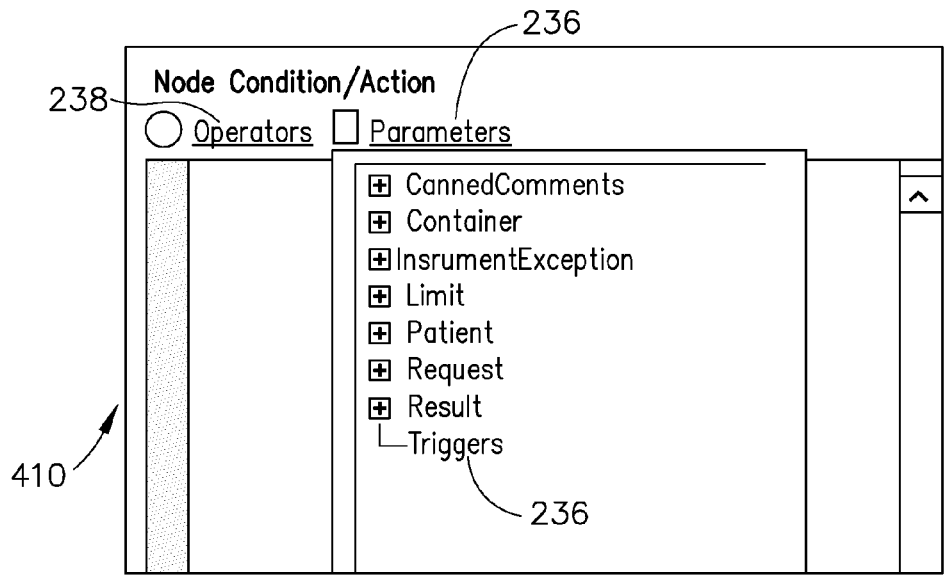

With reference to FIG. 15, upon generating a first node 230 which defines an action or condition, the rule development module 410 may provide a user with a list of parameters 236 and a list of operators 238 for defining the action or condition of the first node, at block 310, and the user may select a parameter 236 or operator 238 to define an action or condition within a node 230, at block 312. Parameters 236 are linked or conditioned by operators 238. Operators 238 includes things such as: relational operators, including equal to not equal to, less than, and greater than; keyword operators which require a certain keyword to be present; date operators which require a certain date; string operators that will allow the user to manipulate strings as part of a condition statement. For example, if patient location starts with WARD 1=(SubStr (Patient:Location,1,5))="WARD 1".

Figure 16:
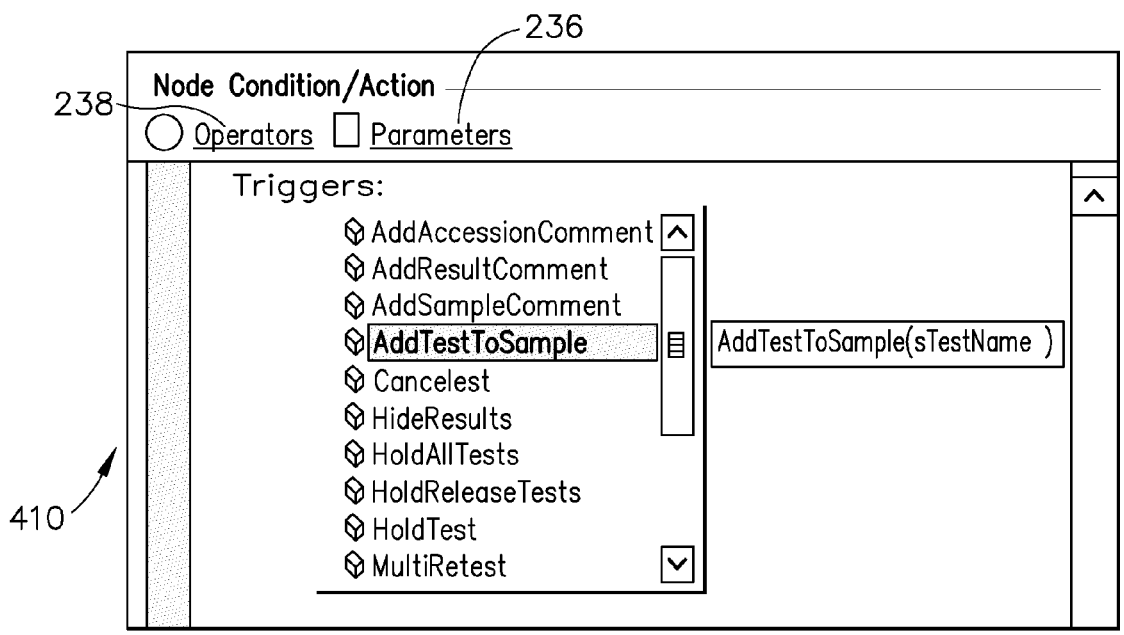

With reference to FIG. 5, the node 230 may be a condition node 234 which defines a condition, such as a sample 206 associated with particular information 208, such as a patient over the age of 50. With reference to FIG. 8, the node 230 may be an action node 232 which defines an action, such as assign the sample 206 to a certain instrument 204 or test. With reference to FIG. 16, a node 230 which defines an action requires that the action be defined using triggers, that is certain actions which must occur if the rule 220 is executed an any conditions within the rule 220 are met. Typically, condition nodes 234 are followed by action nodes 232 within the rule 220.

Figure 7:
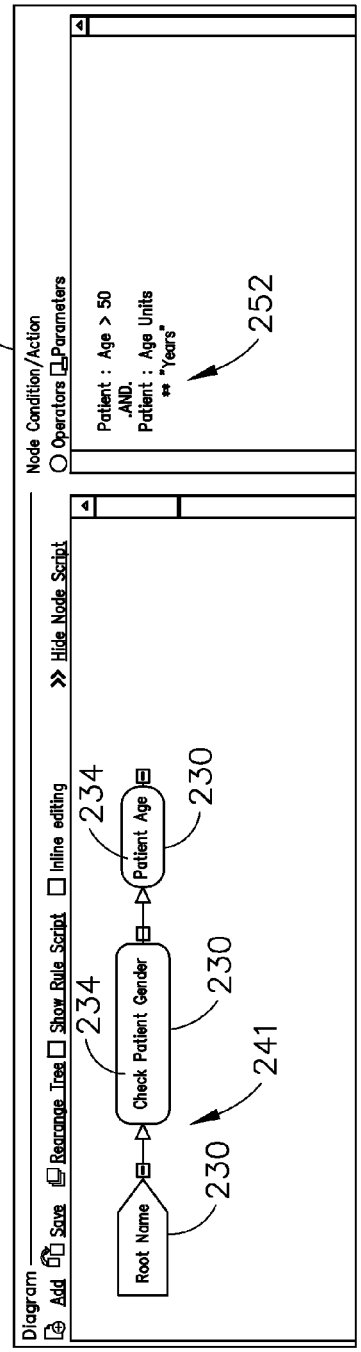

Upon defining an action or condition within a node 230, the method 300 moves to block 314, where it is determined whether or not the rule 220 is fully defined and created. If the rule 220 is not fully defined and created, then the method 300 moves back to block 308 and additional nodes 230 may be generated within graphical diagram 241 in response to user input until the rule 220 is fully defined and created. With reference to FIGS. 7 and 9, as nodes 230 are generated within graphical diagram 241 in response to user input, a node condition/action window 250 is displayed adjacent the graphical diagram 241. The node condition/action window 250 displays program code 252 for executing the action or condition represented by the selected node 230. Concurrent with the generating of nodes 230, the program code 252 is generated by the rule development module 410. Program code 252 is later used by the rule development module 410 to create a computer program under which rule 220 operates.

Figure 10:
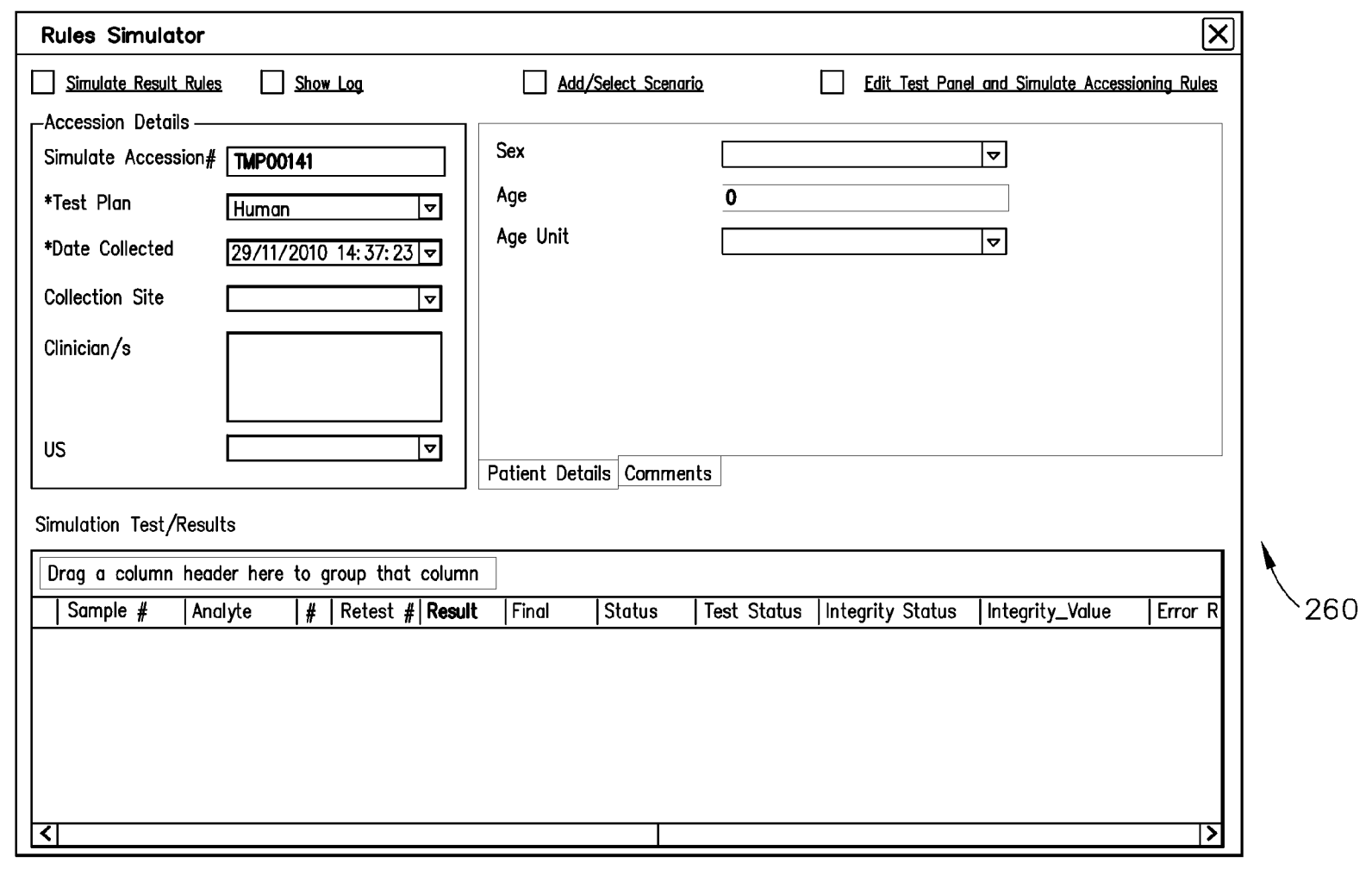
Figure 11:
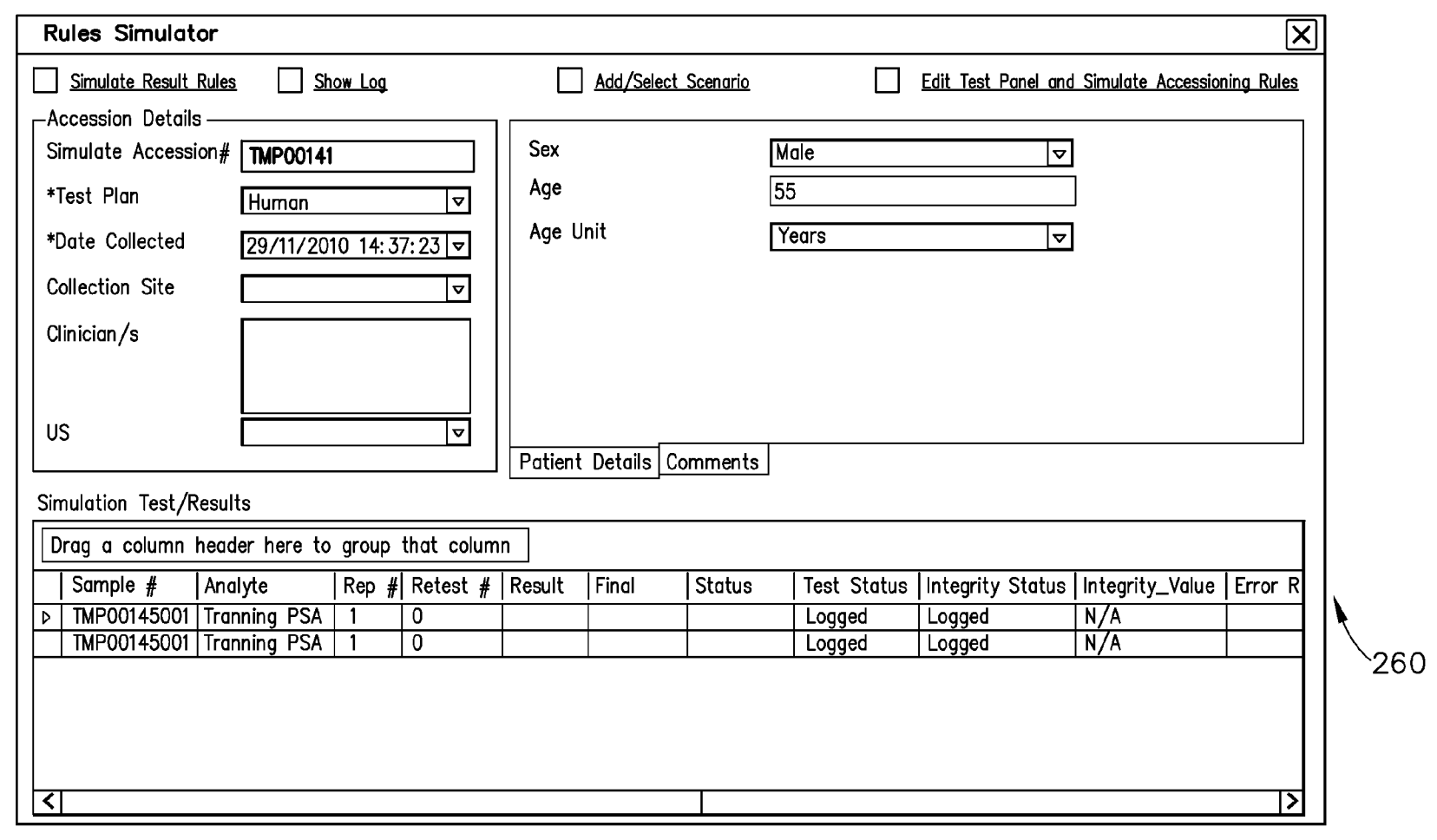

With reference to FIGS. 10 and 11, if the rule 220 is fully defined and created, then the method 300 moves from block 314 to block 316, where the rule 220 is simulated with a simulation module 260 within or connected with the rule development module 410. Simulating the rule 220 allows for a user to determine if a rule 220 is operating as planned or if changes to the rule 220 need to be made, such as by modifying or adding a node 230.

Upon simulating the rule 220, rule development module 410 uses program code 252 to create a computer program under which rule 220 operates, at block 318, and the method 300 ends at block 316.

Figure 13:
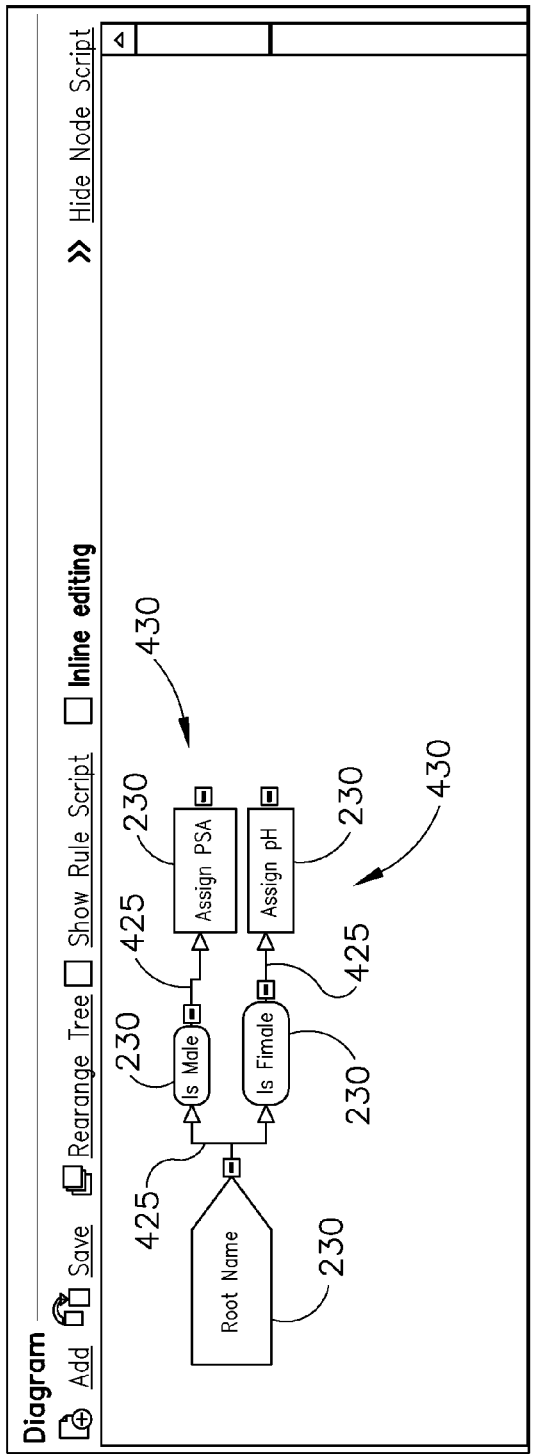
FIG. 13 depicts a rule development module displaying a graphical diagram used to generate a rule, in accordance with one embodiment of the present invention.

With reference to FIG. 13, a link 425 between a pair of nodes 430 is generated and added to the graphical diagram 241 showing the relationship between the two nodes 230. In one embodiment, the link can be connected to a single node 430 at one end and a pair or more of nodes 230 at another end, creating multiple branches 430 within the graphical diagram for defining the rule 220. The user may create as many branches 430 and nodes 230 as necessary to completely define the rule 220.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats.

However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" or "connected with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A non-transitory computer readable memory medium comprising program instructions for graphically creating a rule for defining a workflow in a laboratory management system, wherein the program instructions are executable by a processor to:
generate a first node within a graphical diagram in response to user input, wherein the first node represents an action or condition, wherein the graphical diagram represents the rule, and wherein each node within the graphical diagram assists in creating the rule;
define an action or condition within the first node; and
display a node condition/action window adjacent the graphical diagram, wherein the node condition/action window displays program code for executing the action or condition represented by the first node, and wherein the program code displays the defined action or condition within the first node, wherein the rule is related to a sample or a result from testing a sample in a laboratory, wherein information regarding the sample or the result is communicated to the laboratory management system, wherein the program instructions are executable by the processor to graphically provide a user with a list of parameters and a list of operators for defining the action or condition of the first node.

2. The non-transitory computer readable memory medium of claim 1 further comprising program instructions executable by a processor to convert the graphical diagram into a computer program through which the rule operates.

3. The non-transitory computer readable memory medium of claim 1, wherein the program code for executing the action or condition represented by the first node is generated upon generating the first node.

4. The non-transitory computer readable memory medium of claim 1, wherein the rule is an accessioning rule, a result evaluation rule, or an instrument exception rule.

5. The non-transitory computer readable memory medium of claim 1 further comprising program instructions executable by a processor to generate a second node within the graphical diagram in response to user input, wherein the second node is connected with the first node, and wherein the second node represents an action or condition.

6. The non-transitory computer readable memory medium of claim 1, wherein the laboratory management system is a lab information system, a Process Development Execution System, a Laboratory Information Management System, or a Laboratory Integration Management Solution.

7. The non-transitory computer readable memory medium of claim 1 further comprising program instructions executable by a processor to simulate operation of the rule.

8. The non-transitory computer readable memory medium of claim 1 further comprising program instructions executable by a processor to display the graphical diagram.

9. The non-transitory computer readable memory medium of claim 1, further comprising program instructions executable by a processor to provide a user with a list of parameters and a list of operators for defining the action or condition of the first node.

10. The non-transitory computer readable memory medium of claim 1, further comprising program instructions executable by a processor to determine whether the rule is fully defined or created.

11. The non-transitory computer readable memory medium of claim 1, further comprising a second node, wherein the first node defines an action using a trigger and the second node defines a condition, and wherein upon receiving the trigger the action defined within the first node is performed if the condition defined within the second node is met.

12. The non-transitory computer readable memory medium of claim 1, wherein the specific entity in the laboratory management system includes, a specific test, a specific user, a specific ordering, a specific instrument, or a specific instrument type.

13. A method for graphically creating a rule for defining a workflow in a laboratory management system, comprising:
generating a first node within a graphical diagram in response to user input, wherein the graphical diagram represents the rule, and wherein each node within the graphical diagram assists in creating the rule;
inputting an action or condition into a computer readable memory medium associated with the first node;
converting the graphical diagram into a computer program through which the rule operates, wherein the rule is related to a sample or a result from testing a sample in a laboratory, wherein information regarding the sample or the result is communicated to the laboratory management system; and
providing a user with a list of parameters and a list of operators for defining the action or condition of the first node.

14. The method of claim 13, wherein the inputting of the action or condition requires selecting at least one of a parameter or an operator from a list of parameters or a list of operators.

15. The method of claim 13 further comprising displaying a node condition/action window adjacent the graphical diagram, wherein the node condition/action window displays program code for executing the action or condition represented by the first node.

16. The method of claim 15, wherein the program code for executing the action or condition represented by the first node is generated upon generating the first node.

17. The method of claim 13, wherein the rule is an accessioning rule, a result evaluation rule, or an instrument exception rule.

18. A laboratory management system comprising:
a non-transitory computer readable memory medium; and
at least one processor operable to access from the non-transitory computer readable memory medium program instructions executable by the processor to:

generate a first node within a graphical diagram in response to user input, wherein the graphical diagram represents the rule, and wherein each node within the graphical diagram assists in creating the rule;

receive an action or condition into the non-transitory computer readable memory medium associated with the first node; and convert the graphical diagram into a computer program through which the rule operates, wherein the rule is related to a sample or a result from testing a sample in a laboratory, wherein information regarding the sample or the result is communicated to the laboratory management system, wherein the program instructions are executable by the processor to graphically provide a user with a list of parameters and a list of operators for defining the action or condition of the first node.

19. The system of claim 18, wherein the processor is operable to access from the non-transitory computer readable memory medium program instructions executable by the processor to provide a user with a list of parameters or a list of operators upon receiving the action or condition.

20. The system of claim 18, wherein the processor is operable to access from the non-transitory computer readable memory medium program instructions executable by the processor to display a node condition/action window adjacent the graphical diagram, wherein the node condition/action window displays program code for executing the action or condition represented by the first node.

21. The system of claim 20, wherein the program code for executing the action or condition represented by the first node is generated upon generating the first node.

22. The system of claim 18, wherein the rule is an accessioning rule, a result evaluation rule, or an instrument exception rule.

23. The system of claim 18, wherein the processor is operable to access from the non-transitory computer readable memory medium program instructions executable by the processor to simulate operation of the rule.

* * * * *